A. W. COPLEY.
ELECTRICAL PROTECTIVE DEVICE.
APPLICATION FILED DEC. 14, 1915.
1,210,049.
Patented Dec. 26, 1916.
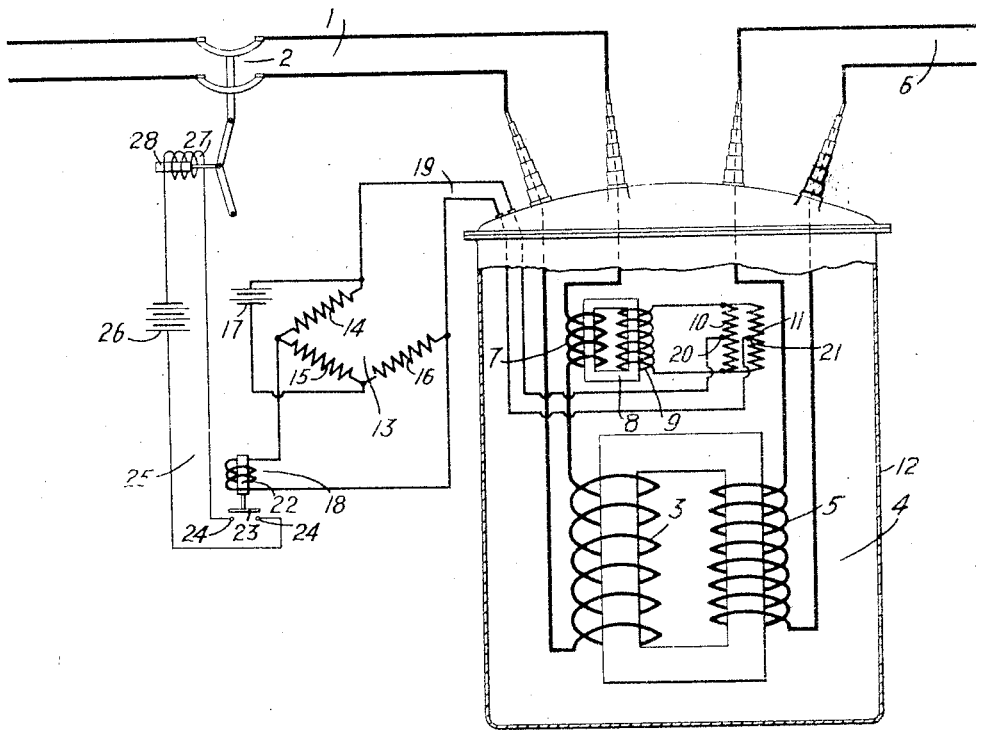
WITNESSES:
Fred. A. Lind
J H Procter
INVENTOR
Almon W. Copley
BY
Wesley G. Carr
ATTORNEY

UNITED STATES PATENT OFFICE.

ALMON W. COPLEY, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,210,049.

Specification of Letters Patent.

Patented Dec. 26, 1916.

Application filed December 14, 1915. Serial No. 66,739.

*To all whom it may concern:*

Be it known that I, ALMON W. COPLEY, a citizen of the United States, and a resident of Wilkinsburg, in the county of Allegheny and State of Pennsylvania, have invented a new and useful Improvement in Electrical Protective Devices, of which the following is a specification.

My invention relates to electrical-protective devices and particularly to means for protecting electrical translating devices in accordance with the temperature thereof.

One object of my invention is to provide an electrical-protective device that is actuated only when the temperature of the translating device to be protected reaches a predetermined value.

Another object of my invention is to provide a device of the above indicated character that shall operate correctly irrespective of changes in the value of the electromotive force impressed upon the device.

Copending U. S. application Serial No. 51,867, filed September 21, 1915 by Charles LeG. Fortescue, and assigned to the Westinghouse Electric and Manufacturing Company, discloses a resistor that is heated in accordance with the energy traversing a translating device. A constant-potential circuit comprising a battery and an electro-responsive device is connected across equal-potential points of the resistor. When the resistance of the resistor changes, because of a change in temperature, the current that traverses the electro-responsive device will vary substantially in accordance with variations in the temperature of the resistor. If the resistor is sufficiently lagged so that its heat emissivity, temperature gradient at currents corresponding to given loads and the heat capacity are the same as the translating device, and, if the potential of the battery remains substantially constant, the electro-responsive device may be actuated in accordance with the temperature of the translating device. However, if the potential of the battery changes, the electro-responsive device may not function properly.

In order to preclude the improper functioning of the electro-responsive device, I provide a resistor that is heated in accordance with the energy that traverses the translating device. I provide also a Wheatstone bridge one arm of which comprises the resistance of the resistor between the equal-potential points thereof and I connect a battery across two of the terminals of the Wheatstone bridge and an electro-responsive device across the remaining terminals thereof. When the resistor is heated to such a degree that it is advisable to disconnect the translating device, the resistance across the equal-potential points is sufficient to cause the Wheatstone bridge to become balanced, thereby deënergizing the electro-responsive device. The electro-responsive device may be utilized to control the operation of either a circuit interrupter, an oil pump or any other protective device. Since the bridge is adapted to be balanced irrespective of the applied electromotive force, the electro-responsive device will function correctly under all balanced conditions.

The single figure of the accompanying drawing is a diagrammatic illustration of an electrical translating device that is protected by a relay system embodying my invention.

An electrical circuit 1 is provided with an interrupter 2 and has a primary winding 3 of a transformer 4 operatively connected thereto, the secondary winding 5 of which is connected to an electrical circuit 6. The primary winding 7 of a current transformer 8 is connected in circuit with the primary winding 3 of the transformer 4, and the secondary winding 9 of the transformer 8 is connected in shunt relation to two non-inductive resistors 10 and 11. The transformer 8 and the resistors 10 and 11 are so disposed in a transformer tank 12 that the temperature thereof is substantially that of the transformer 4. However, the resistors 10 and 11 may be placed in an external oil tank and be sufficiently lagged to cause the temperature to vary in accordance with the temperature of the transformer 4.

A Wheatstone bridge 13 comprises three resistors 14, 15 and 16, a source 17 of electromotive force and an electro-responsive device 18. The resistors 14, 15 and 16 constitute three arms of the bridge 13, the fourth arm constituting a circuit 19 comprising that part of the resistors 10 and 11 which is included between equal-potential points 20 and 21 thereof. The source 17 of electromotive force is connected across two terminals of the bridge 13, and the electro-responsive device 18 is connected across the remaining terminals thereof. The electro-responsive device 18 may consist of a contact-making ammeter or voltmeter, but, for the purpose of illustration, a plunger-type relay is here shown having a movable core member 22, a movable contact member 23 and stationary contact members 24. The stationary contact members 24 are connected in a circuit 25 comprising a source 26 of electromotive force and the winding 27 of a tripping electromagnet 28 that is adapted to control the operation of the circuit interrupter 2.

When current traverses the primary winding 3 of the transformer 4, a substantially proportional current traverses the resistors 10 and 11, and the resistance of the resistors 10 and 11 between the points 20 and 21 is so proportioned that, when the temperature of the transformer 4 reaches a predetermined value, the bridge 13 shall be balanced. When this condition obtains, no current will traverse the electro-responsive device 18 to thus permit the movable contact member 23 to engage the stationary contact members 24 to thereby close the circuit of the winding 27 of the tripping electromagnet 28.

I desire it to be understood that my invention is not limited to the protection of transformers or the tripping of a circuit interrupter as it may be utilized for other purposes without departing from the spirit and scope of the invention as set forth in the appended claims.

I claim as my invention:

1. In a system of distribution, the combination with an electro-responsive device and a resistor adapted to be heated in accordance with the current that traverses the system, of a plurality of resistors constituting three arms of a Wheatstone bridge, the fourth arm of which comprises that part of the first-mentioned resistor between equal-potential points thereof, the electro-responsive device being operatively connected to the bridge.

2. The combination with a translating device, a resistor adapted to be maintained at a temperature corresponding to the temperature of the translating device, and an electro-responsive device, of a Wheatstone bridge one arm of which constitutes that part of the resistor between equal-potential points thereof, the electro-responsive device being operatively connected to the Wheatstone bridge.

3. A protective system for a translating device comprising a resistor adapted to be maintained at a temperature proportional to the temperature of the translating device, a Wheatstone bridge one arm of which comprises that part of the resistor between equal-potential points thereof, and an electro-responsive device operatively connected to the bridge and adapted to operate under predetermined conditions.

4. The combination with a resistor, of a Wheatstone bridge one arm of which comprises the resistance of the resistor between equal-potential points thereof.

5. In a protective system for a translating device, the combination with two parallel-connected resistors heated in accordance with the temperature of the translating device, of a Wheatstone bridge, one arm of which comprises the resistance between two equal-potential points of the said resistors, and means adapted to be actuated by the unbalancing of the current traversing the bridge.

6. The combination with two parallel-connected resistors, of a Wheatstone bridge one arm of which comprises the resistance between two equal-potential points of the said resistors.

7. The combination with a translating device and a protective device therefor, of two parallel-connected resistors adapted to be maintained at a temperature proportional to the temperature of the translating device; a Wheatstone bridge one arm of which comprises the resistance between two equal-potential points of the resistors, and an electro-responsive device operatively connected to the bridge and adapted to control the protective device.

8. The combination with a translating device and a resistor adapted to be maintained at a temperature corresponding to the temperature of the translating device, of a Wheatstone bridge one arm of which comprises the resistance between equal-potential points of the resistor.

9. The combination with a translating device and a resistor adapted to be maintained at a temperature corresponding to the temperature of the translating device, of a Wheatstone bridge one arm of which comprises the resistance between equal-potential points of the resistor, and an electro-responsive device connected across two terminals of the bridge.

In testimony whereof, I have hereunto subscribed my name this 8th day of Dec. 1915.

ALMON W. COPLEY.